United States Patent [19]

Vogtländer

[11] Patent Number: 4,571,237

[45] Date of Patent: Feb. 18, 1986

[54] PROCESS AND APPARATUS FOR FOLDING A SHEET LONGITUDINALLY AND TRANSVERSELY

[75] Inventor: Alfred Vogtländer, Hermsdorf über Waldbröl, Fed. Rep. of Germany

[73] Assignee: Falk-Verlag für Landkarten und Stadtpläne Gerhard Falk GmbH, Hamburg, Fed. Rep. of Germany

[21] Appl. No.: 616,399

[22] Filed: Jun. 1, 1984

[30] Foreign Application Priority Data

Jun. 9, 1983 [DE] Fed. Rep. of Germany ....... 3320731

[51] Int. Cl.$^4$ .............................................. A31F 1/00
[52] U.S. Cl. ................................... 493/416; 198/774; 493/437; 493/448; 493/451
[58] Field of Search ............... 493/413, 416, 417, 419, 493/422, 423, 437, 440, 448, 449, 451, 447, 421, 446; 270/16, 40; 198/488, 774

[56] References Cited

U.S. PATENT DOCUMENTS

| | | | |
|---|---|---|---|
| 1,313,712 | 12/1915 | MacFarland | 493/422 |
| 1,892,496 | 12/1932 | Willard | 242/55 |
| 2,890,044 | 6/1959 | Wisdom | 493/413 |
| 3,143,363 | 8/1964 | Falk | 283/35 |
| 3,605,981 | 9/1971 | Danieli | 198/774 |
| 3,632,103 | 1/1972 | Nikitits | 493/411 |
| 4,227,684 | 10/1980 | Brocklehurst | 493/437 |

FOREIGN PATENT DOCUMENTS

| | | |
|---|---|---|
| 211741 | 8/1907 | Fed. Rep. of Germany . |
| 1436588 | 5/1964 | Fed. Rep. of Germany . |
| 1808885 | 11/1968 | Fed. Rep. of Germany . |
| 1098624 | 8/1955 | France . |

Primary Examiner—Francis S. Husar
Assistant Examiner—Robert Showalter
Attorney, Agent, or Firm—Body, Vickers & Daniels

[57] ABSTRACT

A process and a device for folding a sheet longitudinally and transversely, in which the lower folds and the upper folds of a plurality of pairs of longitudinal folds of a Leporello fold are formed in sequence by fold straight edges that are movable towards each other, the front edges of the fold straight edges being moved along an arcuate path to the sheet in order that there is contact between them and the sheet only at the end of said movement. The longitudinally folded sheet is then laid on the parallel contact edges of the transverse fold plates that are arranged at intervals adjacent to each other, and pressed together therebetween, the areas between the transverse fold plates being pressed downwards by pressure elements which are moved upwards and out once again prior to the completion of the movement of the transverse fold plates towards each other. Thus it is possible to form all the transverse folds in one stage of the process.

18 Claims, 14 Drawing Figures

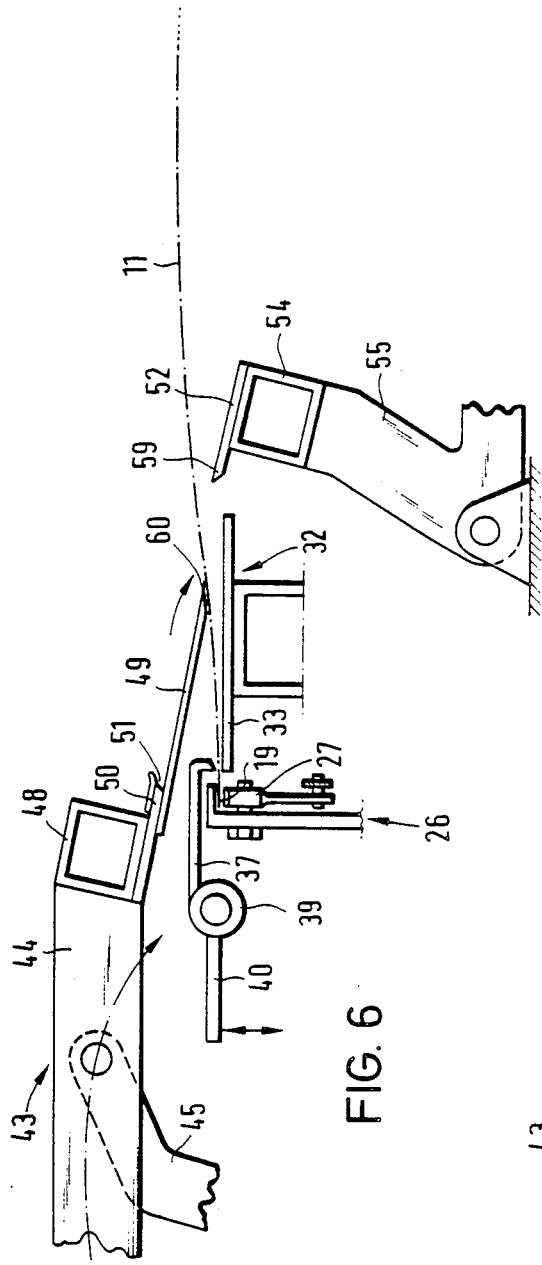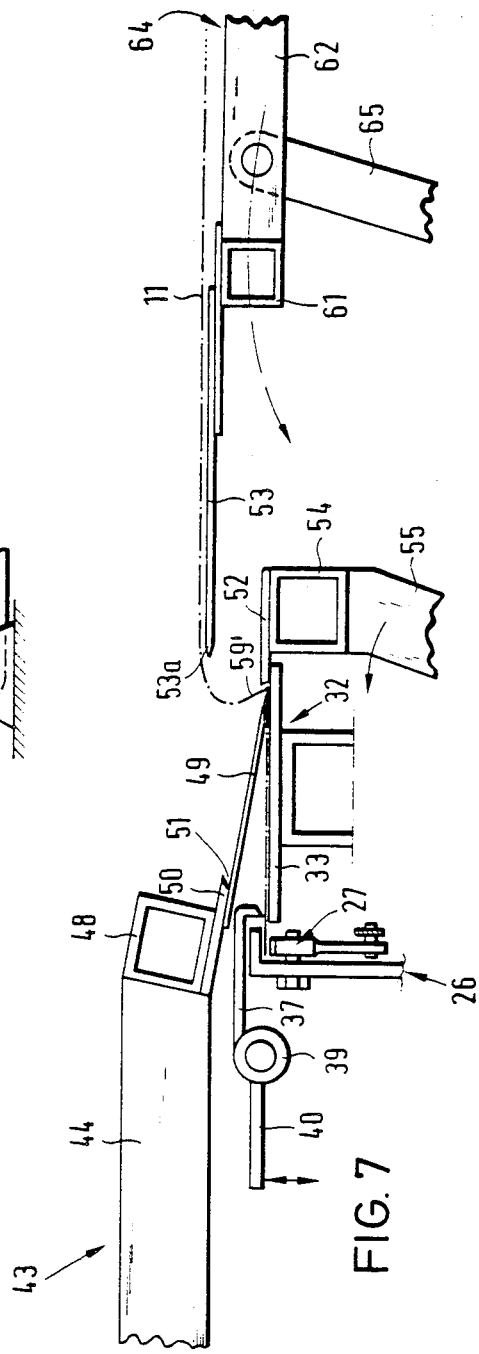

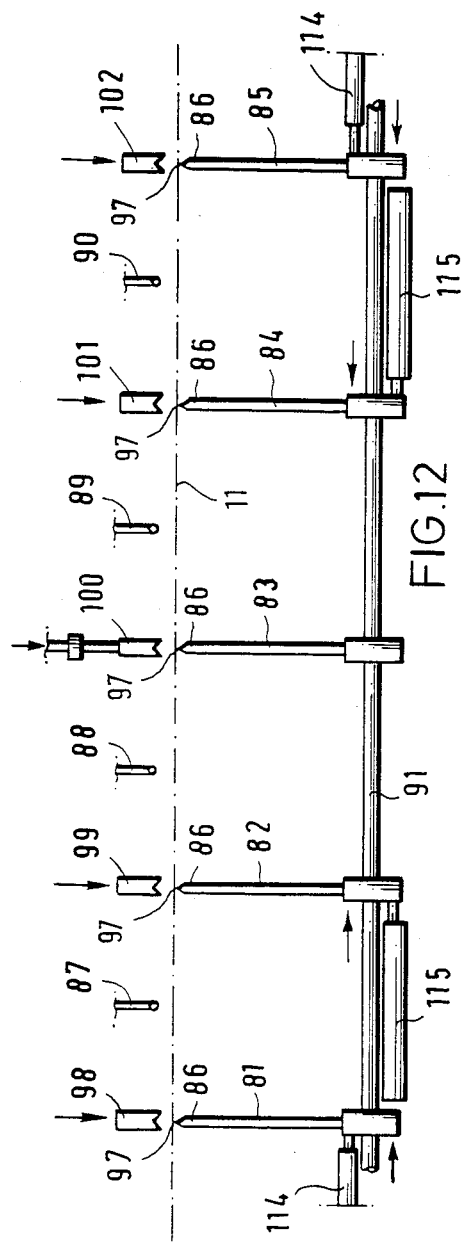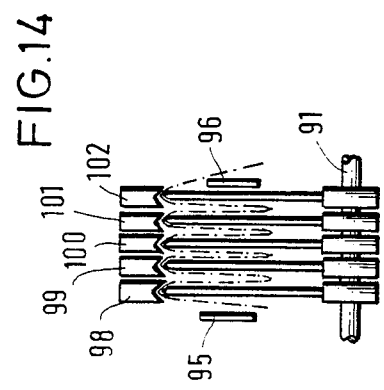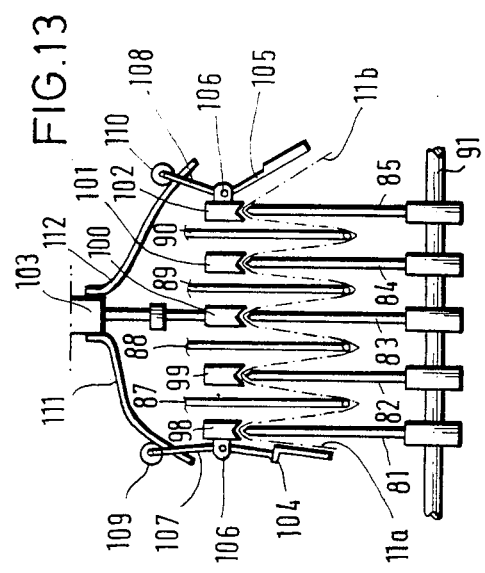

PROCESS AND APPARATUS FOR FOLDING A SHEET LONGITUDINALLY AND TRANSVERSELY

DISCLOSURE

The present invention relates to a process and a device for folding a sheet longitudinally and transversely, particularly for maps that have transverse cuts, in which a plurality of longitudinal folds are arranged in the manner of Leporello folds, these being displaced laterally in relation to each other, the longitudinally folded map then being provided with transverse folds as Leporello folds, these being situated one above the other.

BACKGROUND OF THE INVENTION

It is conventional to provide map sheets with Leporello folds both longitudinally and transversely, so that said sheets can be grasped by opposite edges and drawn apart in order that the whole of the sheet can be rapidly viewed. In addition, it is also conventional to arrange the long folds of a map sheet so that they are staggered relative to each other, and to provide the map sheet with transverse cuts in order to make it possible to leaf through the map as one would a book and be able to read small sections without having to open the map out completely. However, the production and the folding of such map sheets entails considerable difficulties, particularly if the sheets have been provided with transverse cuts, which have to be made when the sheet is laid out flat since, once the folding process has been completed, these cuts are not superimposed above each other in a folded map. The sheets are rendered very unstable by the transverse cuts, with the result that they can be extremely difficult to handle during the folding process. For this reason, it has up to now not been possible to machine fold sheets of this kind. Thus, up to the present time they have simply been creased and then folded manually, sheet by sheet, which gives rise to greatly increased time and labour costs.

INVENTION

The present invention provides a process and a device with which sheets, particularly map sheets provided with transverse cuts, can be provided with machine-set Leporello folds, both longitudinally and transversely, this being done with great care, whereby high production rates can be achieved.

According to the present invention there is provided a process for forming longitudinal and transverse folds in a sheet, in which a plurality of longitudinal folds are arranged in the manner of Leporello folds and being offset relative to each other in the transverse direction, the longitudinally folded sheet then being provided with transverse folds arranged above each other as Leporello folds, in which during the longitudinal folding process, at places at which in each instance a lower fold is to be produced, a first fold straight edge is applied to one side of the sheet, in order to form the associated upper fold a second fold straight edge is slid at a vertical interval to the first fold straight edge over this on the other side of the sheet such that it acts on the sheet at a location that is at a distance from the lower fold and bends it back into a fold pocket, then, after the production of all the longitudinal folds the longitudinally folded sheet is laid on the parallel contact edges of transverse fold plates that are arranged adjacent to, and at intervals from, each other, pressed therebetween and pressed together laterally with the transverse fold plates to produce all the tranverse folds simultaneously.

Thus, according to the present invention, the longitudinal fold is produced at the location of the lower fold that is to be produced in each instance, a first straight-edge is applied to one side of the sheet, and then, in order to form the associated upper fold a second straight-edge is slid ahead of this at a vertical interval from the first straight-edge over this on the other side of the sheet such that it catches the sheet at a location that is at a distance from the lower fold and doubling back presses it into a fold pocket, and in that then, after all the longitudinal folds have been produced, the sheet that has been folded longitudinally is laid on the parallel edges of transverse fold plates that are arranged at intervals adjacent to each other, pressed between these, and pressed together sideways with the transverse fold plates, in order that all the transverse folds are produced simultaneously.

Using such a process it has been possible to produce the desired transverse and longitudinal folds even in wide sheets that have transverse cuts there and are produced from more or less thin paper, and to do this with the help of machine-operated tools, without the danger that the sheet will be damaged when the portions of the sheet that are located between the folds are slid over one another. Further, the work proceeds very rapidly, since all the transverse folds are produced in one single operation.

The production of the longitudinal folds is simplified when, after application of the straight-edge, a fold rail is pressed against the front edge of the straight-edge from the other side of the sheet. This means that the sheet will be aligned on the straight-edge before the second straight-edge contacts the lower surface from the other side. Since this second straight-edge acts on the sheet at a place that is remote from the front edge of the first straight-edge, the sheet is initially only slightly affected by the second straight-edge that slides along it, so that no tearing can take place on the front edge of the first straight-edge. Furthermore, the sheet is already secured beneath the first straight-edge, before the second straight-edge acts on it to form the upper fold.

The present invention also provides a device for effecting the foresaid process which comprises a plurality of longitudinal fold stations sequentially arranged in the direction of the longitudinal folds in the sheet, in which one pair of longitudinal folds consisting in each instance of lower folds and upper folds is formed sequentially in the sheet, a transfer station with a carrier system that is movable transversely to the direction of the longitudinal folds, which moves the sheet, provided with all the longitudinal folds and folded together, to a transverse fold station, having a plurality of transverse fold plates that are movable together in the direction of the longitudinal folds and, therebetween pressure elements that are movable transversely to the longitudinal folds.

Thus, the device according to the present invention for carrying out the process has a plurality of longitudinal fold stations that are arranged in the direction of the longitudinal folds in the sheet, in each of which stations there is sequentially formed one pair of longitudinal folds consisting of a lower fold and upper fold. An adjoining transfer station having a carrier that can be moved transversely to the direction of the longitudinal folds then moves the sheet provided with all the longitudinal folds and folded together to a transverse fold station which, in the case of the present invention, has a plurality of transverse fold plates that are movable against each other in the direction of the longitudinal folds and, between them, pressure elements that are movable transversely to the longitudinal folds.

Using such a device, it is possible to sequentially produce in each sheet one pair of longitudinal folds in identical longitudinal fold stations through which the sheet passes through in sequence. In this connection, the moving parts of all the longitudinal fold stations can be powered (driven) simultaneously, which means that it is possible to achieve very high operating speeds. The installed length of the machinery can be kept within specific limits by changing the direction of movement and allowances made for the different path of movement of the transverse fold stations, between the transverse fold plates of which, that can be moved towards each other, the longitudinally folded sheet is pressed down by the pressure elements, so that the undulations of the sheet that lie between the transverse fold plates are pressed together when the transverse fold plates move towards each other and all of them are folded transversely at the same time. This results in an extremely simple mechanical sequence that nevertheless ensures that the folds in the sheet lie precisely on atop the other and the folded sheet is of a pleasing aesthetic appearance and can be further processed very easily, for example, cemented to a cardboard cover that extends very slighly beyond the edges of the folded sheet.

The longitudinal fold stations and the transfer station are most expediently arranged adjacent to each other in a row, in front of which is arranged a conveyor system that moves the sheets on from one longitudinal fold station to another and to the transfer station. Such a configuration has the advantage that several sheets can be moved on by the conveyor system from one longitudinal fold station to another and from there to the transfer station, and that the conveyor system can return during the folding process and pick up the next sheet that is to be folded from a stack.

The conveyor system may be a carriage or slide that extends across the length of all the folding stations and the transfer station reciprocable in the direction of the longitudinal folds, and has clamps for holding each long edge of the sheets that are to be moved. It is expedient that each longitudinal fold station have a table, a first, upper fold straight-edge movable transversely to the direction of the longitudinal folds, a fold pocket for production of the lower fold, a second, lower fold straight-edge movable transversely to the direction of the longitudinal folds, a fold pocket for production of the upper fold, and a pressure rail movable against the table so as to press the longitudinal folds together when the longitudinal folds have been formed and the fold straight-edges have been withdrawn.

The fold pockets may be bounded by a fold rail movable against the front edge of the associated straight-edge, with which it forms the fold pocket. This means that the sheet will be processed particularly carefully at the location of the fold since in order to produce the break it will not be pressed into a fold pocket that defines the break on both sides, but will be held on one side by the fold straight-edge, whereas the fold will be first formed subsequently by the application of the foldrail and the sheet wrapped around the foot edge of the fold straight-edge.

It may be more expedient to form the upper fold if the associated fold pocket is bounded by a stop rail that is arranged on the upper surface of the associated straight-edge and secured to this.

It is particularly advantageous when at least the second straight-edge is so supported and guided that its front edge describes a curve on its path to the fold pocket, the vertex of said curve lying in front of the fold pocket. The front edge of the second fold straight-edge is then situated in its departure position at a specific distance from the front edge of the first fold straight-edge and describes a slight curve upwards. This means that it picks up the sheet at a location that is ahead of the front edge of the lower fold straight-edge, raises it slightly, and guides it in the arc into the fold pocket in which the upper fold is formed. Since the second fold straight-edge follows a convex curve during the movement, when being bent back at the start, the sheet of paper will not be greatly stretched around the front edge of the first fold straight-edge, but will only be drawn tight in the phase of the advancing movement of the second fold straight-edge. This means that it is possible to avoid any damage to the sheet of paper. In order to achieve the movement that is desired, each fold straight edge is best part of an articulated parallelogram linkage so that both will follow the desired curve when advanced.

Each longitudinal fold station can have stationary clamping devices that secure the sheet on the table directly adjacent to the upper fold that is to be formed in each station. This means that as the fold is being formed the sheet can move freely only at that part that is required for the formation of the longitudinal folds. No movement is possible on the base, so that the conveyor system clamps can be released and the conveyor can return to its next transport position.

The carrier system of the transfer station is most expediently a carrier plate that at a lateral interval from the transverse fold plates of the transverse fold station has transverse slots and can be slid forward above the transverse fold plates and then downwards between these. Such a configuration permits a very simple mechanical design for the transfer station, which can be safely and precisely controlled.

In order to achieve precise transverse folding of the sheet that has been folded in the longitudinal direction, the transverse fold plates have a chamfer on their upper contact edge for the longitudinally folded sheet according to the present invention. Channel rails that can be lowered are arranged above the transverse fold plates, on their upper contact edges and these secure the sheet that has been positioned on the sharpened contact edges of the transverse fold plates and form bending grooves therein. Together with the transverse fold plates the channel rails can be moved together, so that those portions of the sheet that has been folded longitudinally which lie above each other cannot shift.

It is expedient that flaps be articulated onto the outer channel rails, these being controlled by curves that press the outer portions of the sheet against the outer transverse fold plates when the transverse fold plates and the channel rails are moved together. Such a configuration makes it possible to free at least one of the outer areas of the sheet immediately after completion of the transverse folding process, which is important when the longitudinally and transversely folded sheet is to have its outer portions cemented into a binder or cover.

According to a further feature of the invention, the pressure elements that are movable transversely to the longitudinal folds of the sheet are installed above the longitudinally folded sheet and intermediate the transverse fold plates. As the transverse fold plates begin to move towards each other they press the longitudinally folded sheet between the transverse fold plates and before the end of the movement by the transverse fold plates towards each other they move out from between these once again. In this manner the simultaneous formation of all the transverse folds is initiated by the pressure elements and completed by the transverse fold plates.

It is particularly advantageous when the transverse fold plates have congruent recesses on those of their edges that are not chamfered in which grippers can engage, the grippers then pressing the transversely folded sheet together and removing it from between the transverse fold plates.

A particularly simple design and trouble-free operation of the device is assured when all the moving parts of the machine are operated pneumatically.

The present invention will be further illustrated by way of the accompanying drawings, in which:

BRIEF DESCRIPTION OF THE DRAWINGS

FIGS. 6 and 7 are a partial cross-section of the object as in FIG. 1 on the line VI—VI, which shows the first longitudinal fold station during formation of the first lower fold and the first upper fold in the sheet;

FIG. 12 is a schematic partial view of the transverse fold system shown in FIGS. 9, 10 and 11 on the line XII—XII, the transverse fold plates being apart;

FIG. 13 is a schematic representation of the transverse fold system shown in FIG. 12, the transverse fold plates being partially drawn together and the pressure elements inserted between these; and FIG. 14 is a schematic front view of the transverse fold station with the transverse fold plates moved completely together, and grippers to remove the folded sheet.

PREFERRED EMBODIMENT OF THE INVENTION

Figure 1:
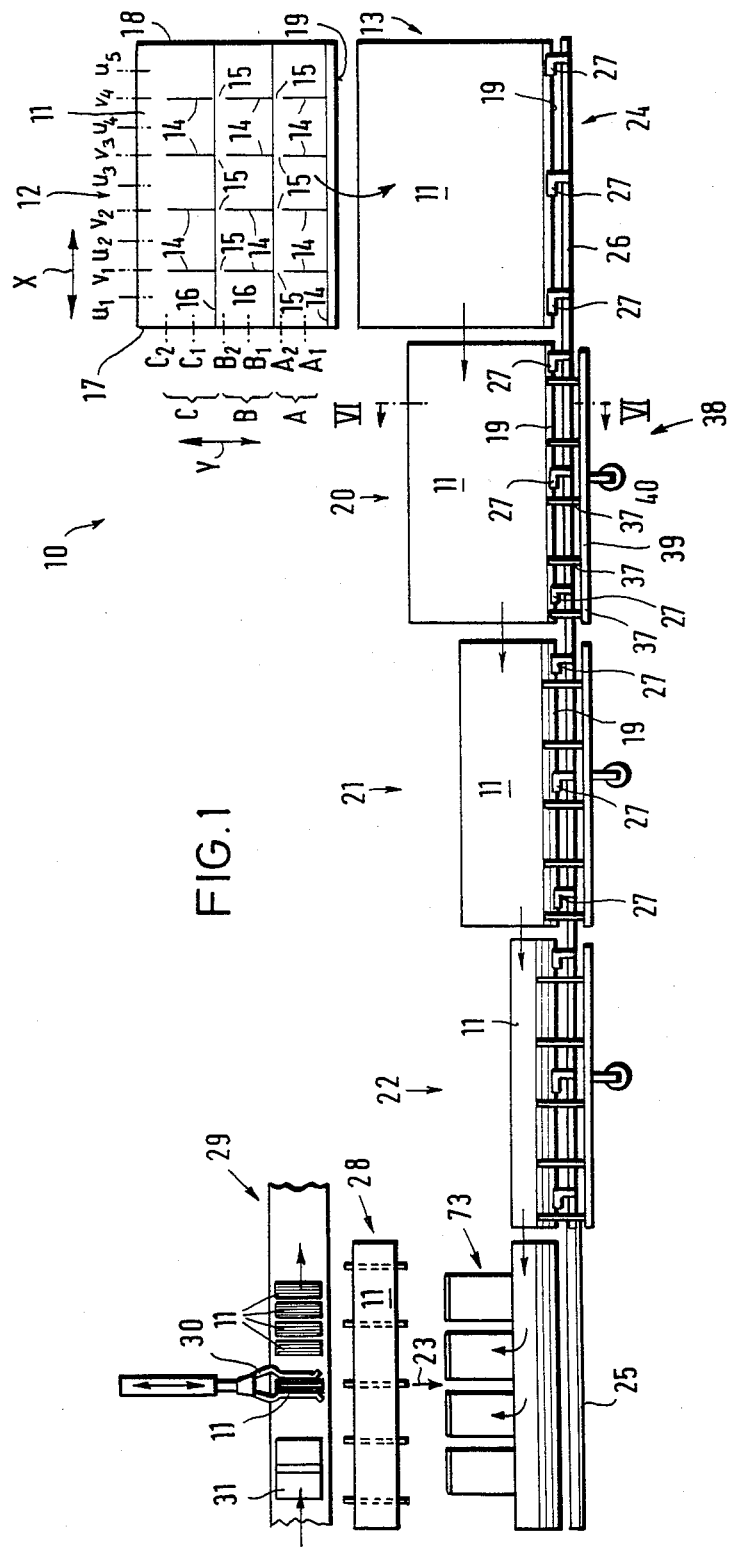
FIG. 1 is a schematic plan view of a device according to a preferred embodiment of the present invention used to fold a map provided with transverse slits both longitudinally and transversely.
Figure 2:
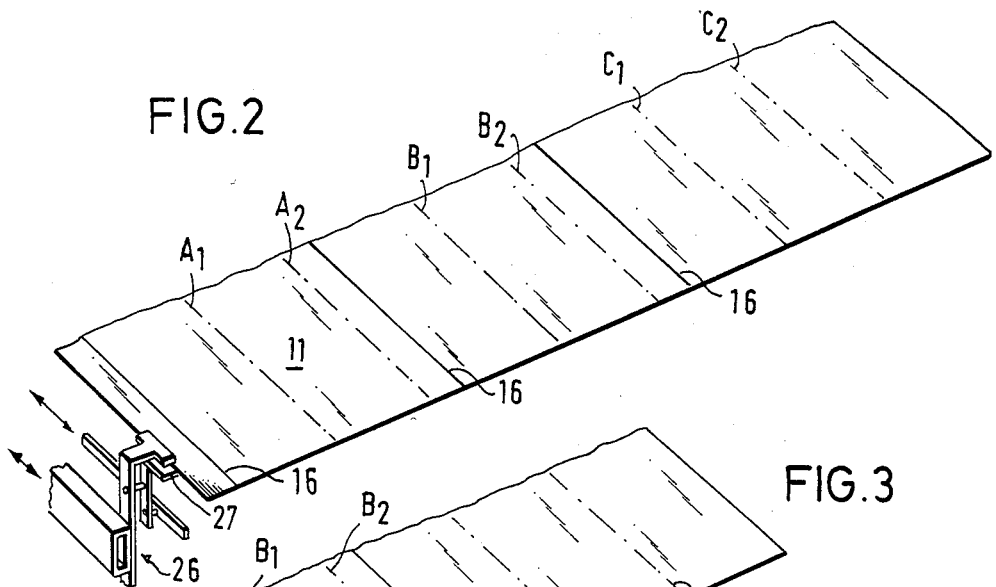
FIGS. 2, 3, 4 and 5 illustrate the process to produce the longitudinal folds according in a section of a map sheet according to the present invention, and the clamps that secure it during the various stages of the process.
Figure 3:
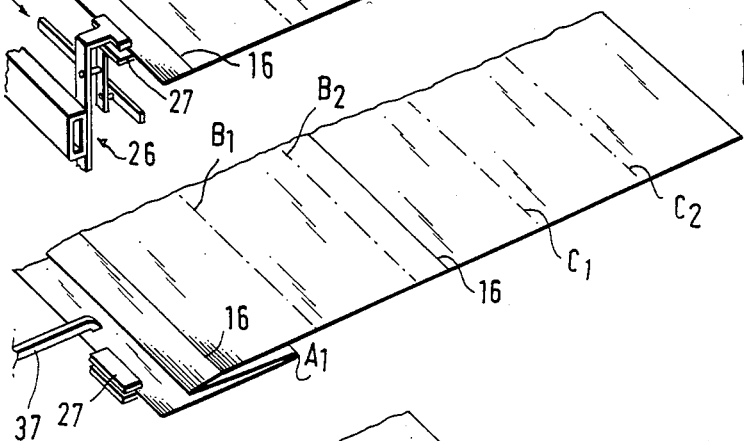
Figure 4:
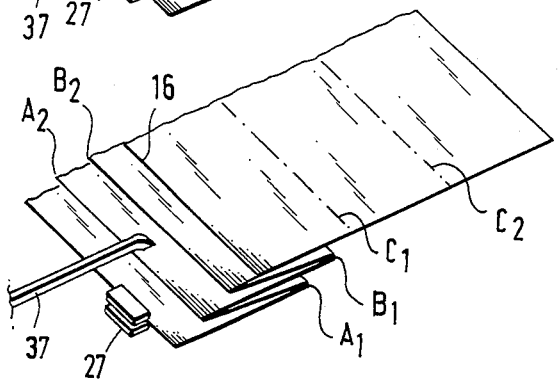
Figure 5:
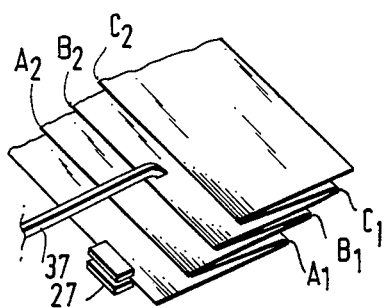

Referring to the drawings a device 10 is used to fold map sheet 11 longitudinally and transversely, said map sheet being in a supply stack 12 from which they are moved one after the other to a layout table 13. The map sheets have several transverse slits 14 arranged at intervals in the longitudinal direction X, these being separated from each other in the transverse direction Y by the narrow segments 15 and thus do not extend completely across the sheet in the transverse direction. In addition to the transverse slits 14 there are longitudinal grooves 16 in the sheet, these being intended to make it easier to fold the segments of the map if the map is read in book form. These grooves 16 are of no significance to the longitudinal and transverse folds made in the map sheet in the sense of the present invention. They serve only to mark those places on the map sheet 11 at which the upper folds will lie on the map sheet.

Three pairs of longitudinal folds A, B and C, each having a lower fold $A_1$, $B_1$, or $C_1$, respectively, and an upper fold $A_2$, $B_2$, or $C_2$, respectively, the lines of said folds being indicated by the broken lines in FIGS. 1 to 5. In addition, each map sheet 11 is provided with nine transverse folds U and V, these also being indicated by broken lines in FIG. 1, and of which the transverse folds $V_1$, $V_2$, $V_3$, and $V_4$ are arranged in the line of the transverse cuts 14, whereas the transverse folds $U_1$, $U_2$, $U_3$, $U_4$, and $U_5$ are arranged between the transverse cuts 14 or between them and the two cross-edges 17 and 18, respectively. The front edge of each map sheet 11 is numbered 19.

Adjacent to the layout table 13 there are three longitudinal fold stations 20, 21 and 22, and a transfer station 23, all of these being arranged sequentially and adjacent in direction X. In front of these there is a conveyor system 24, this conveyor system having a slide-type track and extending across the whole length of the layout table 13, the longitudinal fold stations 20, 21, 22, and the transfer station 23, and along which a carriage or slide 26 travels, said carriage or slide 26 being shorter by one station than the track 25 and having a plurality of clamping devices 27 by which the front long edge 19 of the map sheet 11 can be gripped. Adjacent to the transfer station 23 in the transverse direction Y there is a transverse fold station 28 behind which there is a removal system that serves to remove the longitudinally and transversely folded map sheets 11 once these have been taken out of the transverse fold station 28 by a gripper and fitted with a map cover 31 that is passed to the gripper 30.

Figure 8:
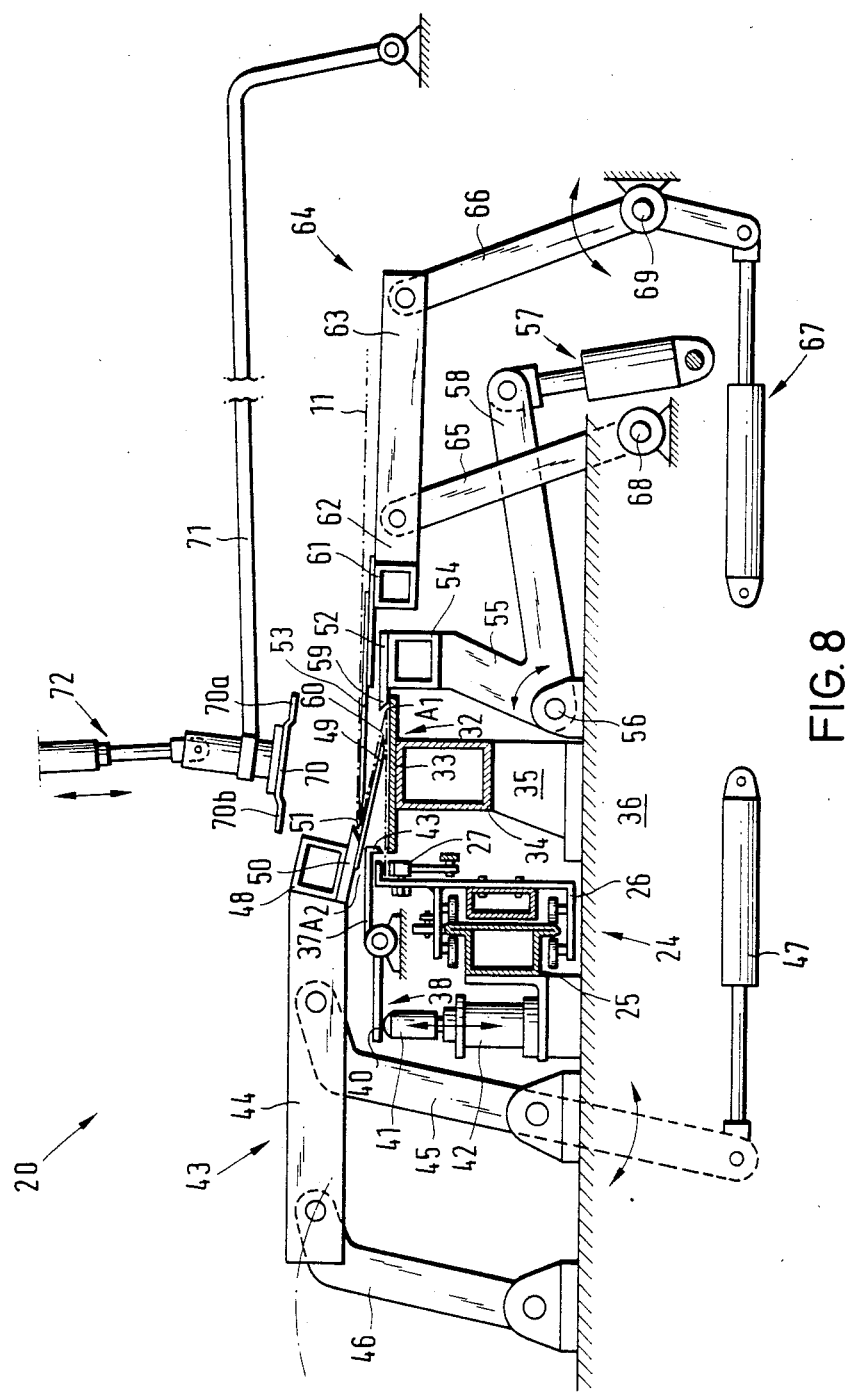
FIG. 8 is a complete cross-section of the object as in FIG. 1 on the line VI—VI after the formation of the first upper fold and the first lower fold in the sheet, before the return of the fold straight-edge and the fold rail.

The longitudinal fold stations 20, 21, and 22, indicated only schematically in outline are, in the main, all of the same construction, so that only the longitudinal fold station 20 will be described below, this being shown in greater detail in FIG. 8, and the working principles of which can be seen in FIGS. 6 and 7.

Longitudinal fold station 20 has a table 32, the plate 33 of which lies upon a box beam 34, this being mounted on a support 35 in the main machine frame 36 that is only indicated here schematically. The carriage 26 of the conveyor system 24 runs along in front of the table 32, and this is surmounted by the clamping arms 37 of a stationary clamping system 38. The clamping arms 37 are mounted on a common shaft 39 that is rotated by a lever 40, beneath which is installed the piston 41 of a pneumatic cylinder 42. If the piston 41 is moved upwards, the clamping arms 37 are rotated clockwise and their claws 43 press on the front end of the front long edge 19 of the sheet 11 that is lying in the folding station 20 on the table top 33.

The stationary clamping system 38 is beneath a parallelogram linkage 43 that has control arms 44 and bell-crank levers 45 and 46. The bell-cranks 45 and 46 are articulated at one end to the control arms 44, the bell-crank being movable back and forth by means of a piston-cylinder unit 47. At their free, front ends the control arms 44 support a hollow, square bar 48, to the underside of which a straight-edge 49 is secured. Above the straight-edge there is a stop rail 50 which is chamfered on its front, free edge and forms a fold pocket 51 with the first fold straight-edge 49.

On the rear edge of the table 32 are arranged a fold rail 52 and a second fold straight-edge 53. The fold rail 52 is supported by a square-section beam 54 that is secured to bell-crank levers 55, these being mounted so as to be able to pivot about the trunnions 56 in the main machine frame, there being pivotted by a piston-cylinder unit 57 that is articulated onto the free end 58 of a bell-crank lever 55. The fold rail 52 is so arranged that by rotation of the bell-crank lever 55 counterclockwise its free front edge can be pressed against the first fold straight-edge 49. The front edge 59 is also chamfered and together with the front edge 60 of the first fold straight edge forms a fold pocket.

The second fold straight-edge, like the first straight-edge, is secured to a hollow, square beam 61 that is mounted on the free ends 62 of the control arms of a parallelogram linkage 64 that is articulated onto the main machine frame by the bell-crank levers 65, 66, and which can be pivotted about the trunnions 68, 69 by a pneumatic piston-cylinder unit 67.

Above the table 32 there is a pressure rail 70 that presses the longitudinal folds $A_1$ and $A_2$ together, this rail 70 is supported by the arm 71 and can be depressed downwards onto the table 32 by a pneumatic piston-cylinder unit 72, whereupon its projecting edges 70a and 70b press the longitudinal folds $A_1$ and $A_2$ in the map sheet 11 together.

Figure 10:
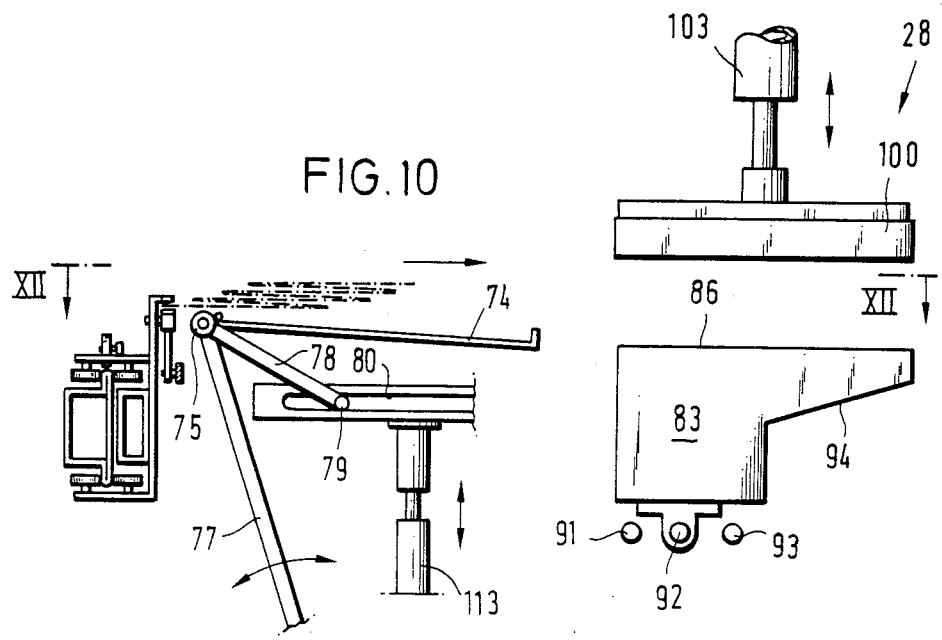
FIG. 10 is a view of the object as in FIG. 9 in schematic partial cross-section on the line X—X in a first working position of the transfer station conveyor system.
Figure 11:
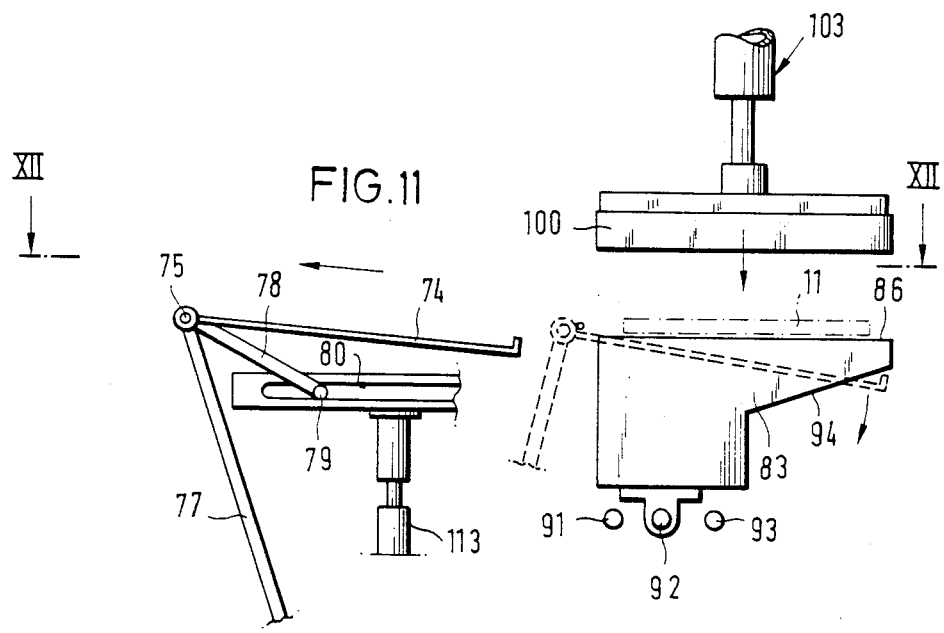
FIG. 11 is a view corresponding to FIG. 10 in which the transfer station conveyor system is in a second working position.

The transfer station 23 that is located in the longitudinal direction X after the longitudinal fold stations 20, 21, and 22 has a carrier system 73 that is movable transversely to the direction of the longitudinal folds A, B, and C in the transverse direction Y, to which the carrier system 24 passes the map sheet 11, provided with all the longitudinal folds A, B, and C and folded together, and which passes it to the transverse fold station 28. The transfer station 23 is shown in greater detail in FIGS. 9, 10, and 11. Its carrier system 73 consists of carrier plates 74 that are secured to a shaft 75 and which have transverse slots 76 left between them. The shaft 75 is supported on the bell-crank levers 77 and provided with links 78, the endpins of which slide in guide slots 80, the height of which is adjustable. With a suitable height adjustment of the guide slots 80 the carrier system 73 of the transfer station 23 can be moved into the area of the transverse fold station 28 by a pivotting movement of the lever 77 such that the carrier plates 74 are located directly above the transverse fold plates 81, 82, 83, 84, and 85 of the transverse fold station 28. In addition, if the guide slots are lowered, the carrier plates 74 can also pivot clockwise about the axis of rotation of the shaft 75, and emerge downwards between the transverse fold plates 81 to 85, once they have laid the longitudinally folded map sheet 11 down on the upper contact edge 86 of the transverse fold plates.

The transverse fold station that is arranged behind the transfer station in the transverse direction Y consists in the main of the above-discussed transverse fold plates 81, 82, 83, 84, 85 and the pressure elements 87, 88, 89, and 90 in the form of rods that are arranged centrally between the transverse fold plates and are above the transverse fold plates when in their initial or starting position. The centre transverse fold plate 83 is fixed and the transverse fold plates 81, 82, 84, and 85 arranged adjacent to it are mounted on the guide rails 91, 92, and 93, located in the lower portion of the transverse fold plates, so as to be displaceable laterally in the direction of the X-axis. The transverse fold plates 82 and 84, and the transverse fold plates 81 and 85 have pneumatic drives that are coordinated with each other such that the outer transverse fold plates 81 and 85 move twice as far per unit time as the center transverse fold plates 82 and 84, so that the interval between the transverse fold plates 81 and 82, and 85 and 84, as well as 82 and 83, and 84 and 83 are reduced to the same degree relative to each other if the transverse fold plates 81 and 82 slide from the left and the transverse fold plates 85 and 84 slide from the right towards the center transverse fold plate 83 (see FIG. 13).

On their sides that face away from the transfer station 23 the transverse fold plates 81 to 85 have congruent recesses 94 for the jaws 95 and 96 of a gripper, the purpose of which will be described in greater detail below. On their upper contact edges 86 the transverse fold plates 81 to 85 have a sharpened portion 97. Above each transverse fold plate 81 to 85 there is in each instance a channel rail 98, 99, 100, 101, and 102, all of which can be lowered simultaneously onto the sharpened portions 97 of the transverse fold plates 81 to 85 and then, resting firmly on the transverse fold plates, displaced with these in the direction of the longitudinal folds of the map sheet 11, i.e., in the X-direction. Similarly, the pressure elements 87, 88, 89, and 90 can be displaced laterally and raised and lowered vertically and provided with a suitable drive, which controls their upwards and downwards motion as a function of the transverse movement of the transverse fold plates 81 to 85 in the X-direction.

On the outer sides of the outermost channel rails 98 and 102 there is in each case a flap 104, 105, respectively that is supported so as to be able to pivot on a pin 106. The flaps 104 and 105 are controlled by the arms 107 and 108 that are attached to them; these arms 107 and 108 are fitted at their ends with rollers 109, 110, respectively, and these move on the curved elements 111 and 112, these being so configured that the flaps 104 and 105 are pressed against the outer surfaces of the outermost transverse fold plates 81 and 85 when the transverse fold plates 81 to 85 are moved together. (FIG. 13).

The map sheets 11 are folded longitudinally and transversely as follows:

The map sheets 11, which have transverse cuts 14 and longitudinal grooves 16, and which are lying on the supply stack 12 are moved one after the other to the layout table 13, where each sheet moves until its front edge 19 is against the contact edge, where it is secured by the gripper jaws of the carriage 26 of the conveyor system 24. At the same time the map sheets that have been provided with longitudinal folds in the longitudinal fold stations 20, 21, and 22 are secured to the carriage 26 by the remaining clamps 27 of the carriage clamping system.

As in FIG. 1, the carriage 26 then moves in the X-direction one station further to the left, its rollers passing along the guide rail 25 as it does so. When this happens, the map sheet 11 that is lying on the layout table 13 is moved to the longitudinal fold station 20, the map sheet 11 in longitudinal fold station 20 is moved to longitudinal fold station 21, the map sheet 11 that is in longitudinal fold station 21 is moved to longitudinal fold station 22, and the sheet that is in longitudinal fold station 22, which has all its longitudinal folds, is moved into the transfer station 23. The sheets in the longitudinal fold stations 20, 21, 22 are then secured by the stationary clamping systems 38 there arranged such that the pneumatic piston-cylinder arrangements 41, 42 press the clamp levers 37 against the upper surface of the table 32. The clamping systems 27 of the carriage 26 are then released and the carriage 26 moves into its starting position as indicated in FIG. 1, in which it can remove the next map sheet 11 from the layout table 13.

In the longitudinal fold stations 20, 21, and 22 the lower folds are formed first, and these are followed by the upper folds of the longitudinal fold pairs A, B, and C, the lower folds $A_1$, $B_1$, and $C_1$ being formed simultaneously, in the same way as the three upper folds $A_2$, $B_2$, and $C_2$, in the three longitudinal fold stations 20, 21, and 22. To this end, the bell-crank levers 45 and 46 of each fold station are pivotted simultaneously in a clockwise direction by their pneumatic cylinders 47, as in FIGS. 6, 7, and 8. This means that the control arms 44 with the first fold straight-edge 49 that is arranged on their front edges slide over and beyond the front edge 19 of the map sheet 11 to that point at which the lower folds $A_1$, $B_1$, $C_1$, respectively, are to be produced. The first fold straight-edges 49 describe a convex arc so that the front edge of each fold straight-edge 49 comes to rest on the sheet from above and only slides across the sheet a little at the last moment and thus ensures that the sheet lies flat on the table top 33.

Next, the angle levers 55 in all three longitudinal fold stations 20, 21, and 22 are pivotted counterclockwise by the pneumatic cylinders 57, whereby the front edge 59 of the fold rail 52 comes into contact with the map sheet 11 from below and bends this upwards against the front edge 60 of the first fold straight-edge 49. The map sheet 11 is thus set up in the fold pocket 59' that is being formed between the front edges 59 and 60 of the fold rail 52 and the fold straight-edge 49, and prefolded, as can be seen from FIG. 7.

Subsequently, the bell-crank levers 65 and 66 of the linkage parallelogram 64 are pivotted counterclockwise in all three fold stations in FIGS. 6, 7, and 8, by the pneumatic cylinders 67. This means that the second fold straight-edge 53 secured to the front end of the control arms 63 slides forward, the front end 53a of this being located when in its starting position at a specific distance from the front edge 60 of the first fold straight-edge and, because of the parallelogram linkage, describes a convex arc in the same manner as the first fold straight-edge. The front edge of the second fold straight-edge 53 thereby acts on the map sheet at a place that is remote from the front edge 60 of the first fold straight-edge 49 and guides it into the fold pocket 51 on the upper side of the first fold straight-edge 49, the front edge 53a of the second fold straight-edge 53 only sliding along on the underside of the map sheet 11, which is now uppermost, while this is being pressed into the fold pocket 51. The fold straight-edges 49 and 53 and the fold rail 52 then move to the positions shown in FIG. 8.

Next, the fold straight-edges 49 and 53 are moved back to their starting positions by the return movement of the levers 45, 46, 55, 65, and 66, whereas the folded map sheets 11 retain their shape and position. The map sheets 11 now lie, secured only by their front edges 19 by the clamping systems 38, freely on the table top 33 of the table 32 and are pressed together by the downwards pressure of the pressure rails 70, so that the upper folds $A_2$, $B_2$, and $C_2$, and the lower folds $A_1$, $B_1$ and $C_1$ are pressed firmly together. Finally, the clamping devices 27 of the carriage 26 once again clamp the front edges 19 of the sheets located in the longitudinal fold stations 20, 21, and 22, which have been provided with longitudinal folds, and move them one station further on once the clamping systems 38 have been released, as has already been described above.

While the longitudinal folds are being formed in the map sheets 11 that are situated in the longitudinal fold stations, the map sheet that has been laid on the carrier system 73 of the transfer station 28 is transferred from the carrier system 73 to the transverse fold station 28. The arms 77 of the carrier system 73 as in FIGS. 10 and 11 pivot clockwise to the right so that the carrier plates 74 are between the transverse fold plates 81 to 85 and above their contact edges 86. By lowering the guide slots 80 with the help of the pneumatic cylinder 113 the carrier plates can be swung out clockwise and downwards between the transverse fold plates 81 to 85 (FIG. 11), the map sheet 11 that was transferred to the transverse fold station remaining lying on the upper contact edge 86 of the transverse fold plates 81 to 85. While the arms 77 pivot back again and the carrier plates 74 return to their starting position by the guide slots 80 being raised the channel rails 98, 99, 100, 101, and 102 are depressed, whereupon they press the map sheet 11 between their channels and the chamfered edges 97 on the contact edges 86 of the transverse fold plates 81 to 85 and produce the grooves at these places in the map sheet 11.

Subsequently, the pressure elements 87, 88, 89, and 90 are lowered simultaneously and the outer transverse fold plates 81 and 85 are moved by the pneumatic cylinder 114 against the center transverse fold plate 83 and the center transverse fold plates 82 and 84 are moved by the pneumatic cylinder 115 against the center transverse fold plate 83. This means that the map sheet 11 is pressed downwards between the transverse fold plates 81 to 85 by the pressure elements 87, 88, 89, and 90 and simultaneously pressed together between the transverse fold plates 81 to 85 (FIG. 13).

Figure 9:
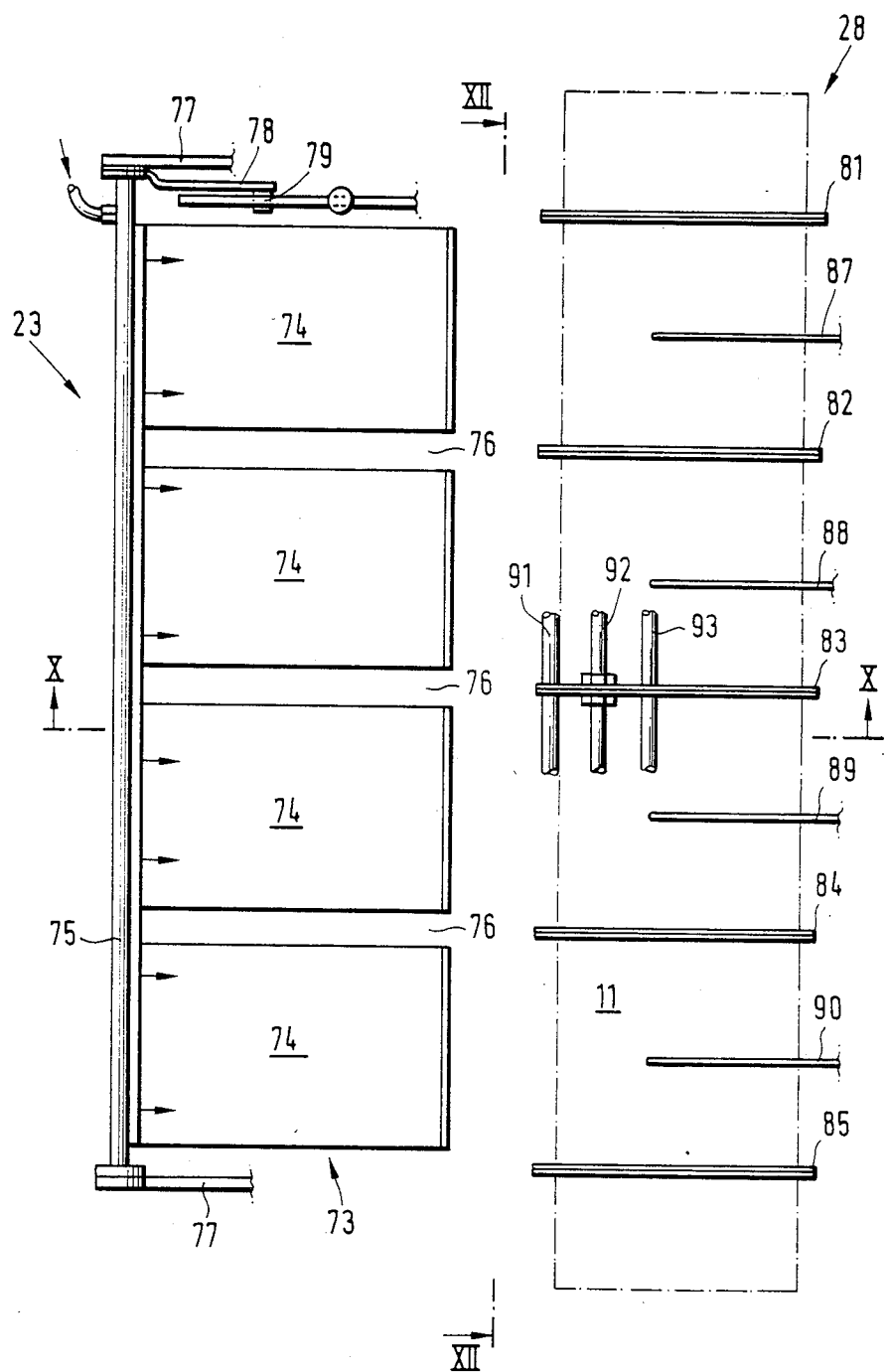
FIG. 9 is a schematic or an enlarged scale of the transfer station and the transverse fold station of the device as in FIG. 1.

Shortly before the transverse fold plates 81 to 85 reach the position in which they are closest together, the pressure organs 87 to 90 between the transverse fold plates 81 and 85 are once again moved up. Simultaneously, the flaps 104 and 105 press the outer parts 11a and 11b of the longitudinally folded sheet downwards against the outer transverse fold plates 81 and 85. The map sheet and the individual parts of the transverse fold system are then positioned as shown in FIG. 14. In this position, in which the map sheet is folded in Leporello folds in the transverse direction as well, it is seized by the holders 95 and 96 of the gripper 30, which draws the folded map sheet 11 from the transverse fold station 28 out to the rear and over the conveyor system 29 that removes the map sheets 11 in the direction of the arrow. The transverse fold plates and the pressure elements are then moved apart so that they assume their original positions as indicated in FIGS. 9 and 12, in which the next map sheet 11 is laid upon them and can be folded in the transverse direction as has been described above.

The present invention is not restricted to the embodiments described; many versions and additions are possible. For example, it is also possible to power the individual components of the machine mechanically or hydraulically, or provide more than three pairs of longitudinal folds, or more than or fewer than nine transverse folds. Furthermore, the process according to the present invention can be used for other sheets that have to transverse cuts or in which all the longitudinal folds lie one above the other.

Having thus described the invention, the following is claimed:

1. A process for forming longitudinal and transverse folds in a sheet, in which a plurality of longitudinal folds are to be Leporello folds offset relative to each other in the transverse direction, said longitudinally folded sheets then being provided with transverse folds provided above each other as Leporello folds, comprising the steps of:
   (a) laying the longitudinally folded sheet on parallel contact edges of transverse fold plates arranged adjacent to, and at intervals from, each other;
   (b) urging said longitudinally folded sheets between said transverse fold plates and at the same time pressing together laterally the transverse fold plates to produce said transverse folds in said longitudinally folded sheets simultaneously.

2. A device for forming longitudinal and transverse folds in a sheet in which a plurality of said longitudinal folds are to be Leporello folds, offset relative to each other in the transverse direction, said longitudinally folded sheet then being provided with transverse folds offset above each other as Leporello folds, said device comprising: a plurality of longitudinal fold stations sequentially arranged in the direction of the longitudinal folds in the sheet, each longitudinal fold station having first and second sides of the sheet thereby providing lower and upper longitudinal folds in said sheet; a transverse fold station, having a plurality of transverse fold plates having means connected thereto for moving said plates laterally together in the direction of the longitudinal folds and pressure elements having means for simultaneously moving said elements transversely to the longitudinal folds between said transverse fold plates; and a conveyor system arranged along and adjacent said plurality of longitudinal fold stations, said conveyor system moving said sheet to each longitudinal fold station and to the transverse fold station in sequence.

3. A device as defined in claim 2, in which said longitudinal fold stations are adjacent to each other in a row, and adjacent to a transfer station, having a carrier moving said sheets transversely to the direction of said longitudinal folds.

4. A device as defined in claim 2, in which the conveyor system is a carriage extending across the length of the plurality of longitudinal fold stations and the transfer station, said carriage being reciprocably movable in the direction of the longitudinal folds and having clamping means secureable to an edge of said sheet that is to be moved through the device.

5. A device as defined in claim 4, in which said longitudinal fold station includes a table; a first, lower fold straight edge movable transversely to the direction of the longitudinal folds; a second upper fold straight edge movable transversely to the direction of the longitudinal folds; a stop rail adapted to form the upper fold; and a pressure rail adapted to press the longitudinal folds together.

6. A device as defined in claim 5, having at least one fold pocket, bounded by a fold rail movable against a front edge of one of said plurality of first and second fold straight edges.

7. A device as defined by claim 6, wherein said fold pocket is bounded by a stop rail arranged on an upper surface of one of said plurality of first and second fold straight edges and rigidly fixed thereto.

8. A device as defined by claim 7, in which at least the second fold straight edge is supported and guided such that its forward edge follows a curved path toward said fold pocket, the vertex of said curve being located in front of said fold pocket.

9. A device as defined in claim 8, in which each fold straight edge is part of a linkage parallelogram.

10. A device as defined in claim 9, in which each longitudinal fold station has stationary clamping means securing said sheet to said table immediately adjacent to said upper fold that is to be produced in said respective longitudinal fold station.

11. A device as defined in claim 10, wherein said first fold straight edge of said longitudinal fold stations and said second fold straight edge of said longitudinal fold stations and corresponding fold rails of said longitudinal fold stations, each have common drive means adapted to simultaneous operation.

12. A device as defined in claim 11, wherein said transfers station has conveyor means with a plurality of carrier plates having transverse slots between themselves corresponding to the distance of the transverse fold plates of said transverse fold station, said carrier plates movable to a position above the transverse fold plates, and downwardly rotatable between said transverse fold plates.

13. A device as defined by claim 12, wherein said transverse fold station is comprised of said transverse fold plates having a chamfered section on their upper contact edge receiving said longitudinally folded sheet, and wherein above the transverse fold plates, a plurality of lowerable channel rails are provided securing said sheet received on said chamfered contact edges of the transverse fold plates to form grooves in the sheet.

14. A device as defined in claim 13, in which said channel rails together with said transverse fold plates are movable laterally towards each other.

15. A device as defined in claim 14, in which flaps are pivotably mounted on the outermost channel rails, movement of said flaps being controlled in a predetermined manner on laterally movement of said transverse fold plates and the channel rails laterally towards each other to press the outermost portions of the sheet against the outermost transverse fold plates.

16. A device as defined in claim 15, in which pressure elements movable transversely to said longitudinal folds of the sheet are arranged above the longitudinally folded sheet equidistant from successive transverse fold plates and reciprocating between a position above said sheets to a position between said successive transverse fold plates to press the longitudinally folded sheet between the laterally moving transverse fold plates, before the end of the lateral movement of the transverse fold plates towards each other.

17. A device as defined in claim 16, wherein said transverse fold plates have mutually congruent recesses on their non-chamfered edges, and a gripper that grips the longitudinally folded sheet through said recesses and from between said transverse fold plates.

18. A device as defined in claim 2 and wherein a pneumatic drive is provided for all moving parts.

* * * * *